J. H. Cary,
Turning Regular Forms,
Nº 3,710. Patented Aug. 21, 1844.
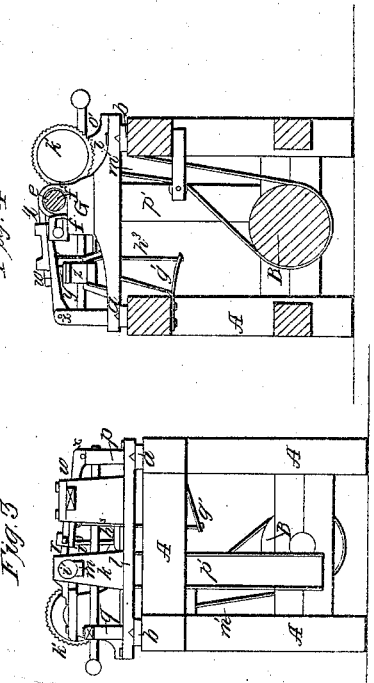
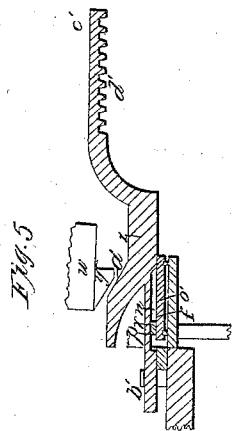
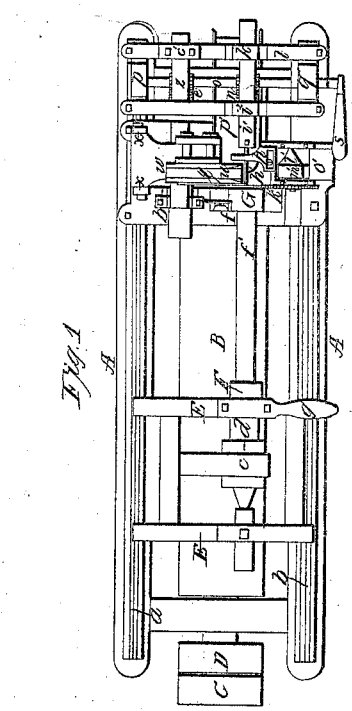
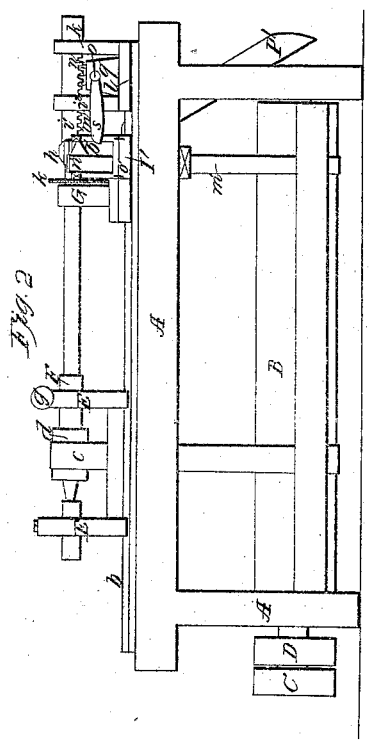

UNITED STATES PATENT OFFICE.

JONATHAN H. CARY, OF NORTH NEW SALEM, MASSACHUSETTS.

MACHINE FOR TURNING SPOOLS.

Specification of Letters Patent No. 3,710, dated August 21, 1844.

*To all whom it may concern:*

Be it known that I, JONATHAN H. CARY, of North New Salem, in the county of Franklin and State of Massachusetts, have invented a certain new and useful Machine for Making Spools and Bobbins, and that the following description and accompanying drawings, taken together, constitute a full and exact specification of the construction and operation of my invention.

Figure 1 of the said drawings represents a top view or ichnographic projection of the machine. Fig. 2 is an elevation of the front side thereof. Fig. 3 is an elevation of the right hand end. Fig. 4 is a central and vertical section taken looking toward the right.

A, Figs. 1, 2, 3, 4 is a frame suitably constructed for sustaining the operating parts. A long drum B, is arranged horizontally within the lower posts of the frame, the said drum being revolved by a belt (from the driving power) which passes around the fast pulley of two pulleys C, D, arranged upon one end of the shaft of the drum—or on the portion denoted by the drawings.

The top part of the frame has parallel rails $a$, $b$, placed upon it, the said rails serving to sustain, and guide movable puppet heads E, E, which are suitably connected together and rest upon them and carrying a mandrel F, to which the piece of wood from which the spools or bobbins are to be formed, is attached, the said mandrel being revolved by a bolt $c$, which passes around the main driving drum, and a pulley $d$, on the mandrel. One end of the piece of wood from which the bobbins are to be turned, being fixed in the end of the mandrel the other end of it is brought up and borne against, or inserted within a circular aperture $e$, formed horizontally through the upper part of a puppet head G. A cutter $f$, (see Fig. 4) fixed within the side of the aperture reduces the stick (as it is revolved by the mandrel) to a cylindrical form.

The operative applies his hand to a handle $g$, projecting from one of the puppet heads E, and draws or slides the puppet head, toward the right. This operation presses the piece of wood against the rounding cutter and causes it to enter and pass through the circular aperture $e$, (as fast as it is reduced) until it meets or comes in contact with the left side of a stop $h$, extending from the circular saw carriage $i$.

The remaining mechanism consists of that for boring the hole or passage through the axis of the bobbin, that for reducing the body of the same so as to form the heads, and the space between them, on which the yarn is usually wound, and lastly that for cutting off or separating the bobbins from the stick as fast as they are successively formed.

The mechanism for boring the hole through the axis of the bobbin, consists of a drill or borer $h'$, Fig. 1, arranged horizontally within the axis of the stick produced, and extending from the end of a mandrel $i'$ which is supported (so as to slide to and fro longitudinally) in the upper end of two standards $i^2$ $k$, elevated vertically upon a transverse frame $l$, which acts upon the rails $a$, $b$. The mandrel $i'$ has a rack $m$, of teeth fitted to its lower side into which a sectoral pinion operates the said pinion being fixed upon a transverse shaft $o$, supported in bearings $p$, $q$. The front end of the shaft $o$, has a handle $s$, extending at right angles from it as seen in Fig. 2. When this handle is raised into a vertical position or thereabouts, the boring tool will be thrown back, or so that its cutting point shall not be in contact with the end of the stick of wood resting against the step $h$. But when the said handle is turned toward the left, or in a horizontal position the boring tool is driven against the wood, and as the wood revolves, bores a hole into the axis thereof, the length of which hole is equal to or a little greater than that of the bobbin.

The cutters for reducing the body of the bobbin or forming the space between the heads thereof are shown at $t$, $w$, $v$, Fig. 1. They are suitably confined by screws to a holder $w$, which at its end opposite to that to which the cutters are attached is jointed to vertical standards $x$, $x$, so as to admit the other end to play or move up and down in a vertical direction. A stud $y$, (see Fig. 4 and Fig. 5 which is a vertical section taken in a longitudinal direction through the rack or cam bar $z$) projects from the side of the cutter holder $w$, and rests upon the top of a cam or inclined plane $a'$, raised upon the rack bar $z$, as seen more particularly in Fig. 5. The said rack bar is supported in suitable bearings $b'$, $c'$, so as to slide to and fro longitudinally. It has a rack $d'$, of teeth upon its underside which engages with a sectoral pinion $e'$, fixed upon the shaft $o$, and so arranged thereon that when the handle $s$, is turned down in order to cause the boring tool to advance toward the stick. The rack bar $y$, will be pressed forward and cause the cutting holder to descend, and thereby bring the cutters $t$, $u$, $v$, against the cylindric surface of the stick $f'$ so as to gradually reduce the same, as the borer continues to advance. The cutter holder is drawn down with the requisite force to cause its cutters to perform their office by a spring $g'$ Fig. 4, which is connected by a rod $h^3$, to the cutter holder. The cutter holder is borne down upon the stick until it rests upon a stop $i^3$.

A circular saw $k'$, (supported on the left end of an arbor $l'$, and driven by means of a band $m'$, which passes around the driving drum, and a pulley $n'$ on the arbor) is employed to cut off the spools or bobbins as fast as they are formed. It is arranged in the position as seen in the drawings and supported upon a horizontal frame $o'$, which is made capable of being moved forward and back so as to carry the saw toward and away from the stick. As soon as the operations of boring and turning are completed, the handle $s$, is elevated, and the saw advanced toward or against the work, so as to cut off a bobbin which drops downward and into a conductor $p'$, which carries it out of the machine. The right face of the saw is placed at a distance from the stop $h$ equal to the length of the bobbin, the cutters which remove the body part of the bobbin, being arranged midway between the saw and stop, as seen in the drawings.

The saw carriage may be thrown forward by a cam arranged on the under side of the rack bar $z$, which when the handle $s$, is thrown back far enough will act against a projection from the saw carriage, and force the saw forward to a sufficient degree for it to accomplish its purpose. The cutter carriage may be forced back by a spring or other proper contrivance suitably arranged.

Having thus described my improvement I shall claim—

The machinery for sustaining the stick, and giving to it a cylindrical form, in combination with that for reducing the cylindric of the stick so as to form the body (of the spool or bobbin) or part on which the thread is wound, with that for cutting off sections or parts of the stick of the length to form spools or bobbins; and with that for drilling or boring the hole through the axis of the stick or spools, the whole arranged and operating substantially as set forth.

In testimony that the foregoing is a true description of my said invention and improvement, I have hereto set my signature this 7th day of March, in the year eighteen hundred and forty four.

JONATHAN H. CARY.

Witnesses:
 THOMAS A. TENNY.
 GEORGE S. EDDY.